W. N. BOOTH.
QUICKLY DETACHABLE TIRE HOLDING RING.
APPLICATION FILED DEC. 5, 1910.
1,049,442.
Patented Jan. 7, 1913.
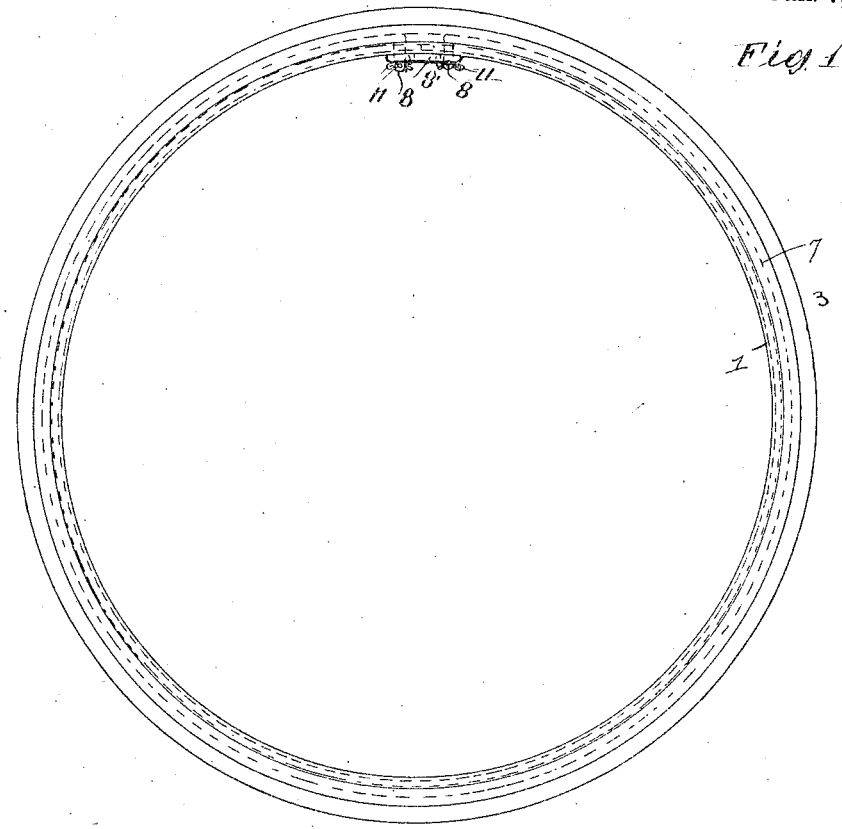
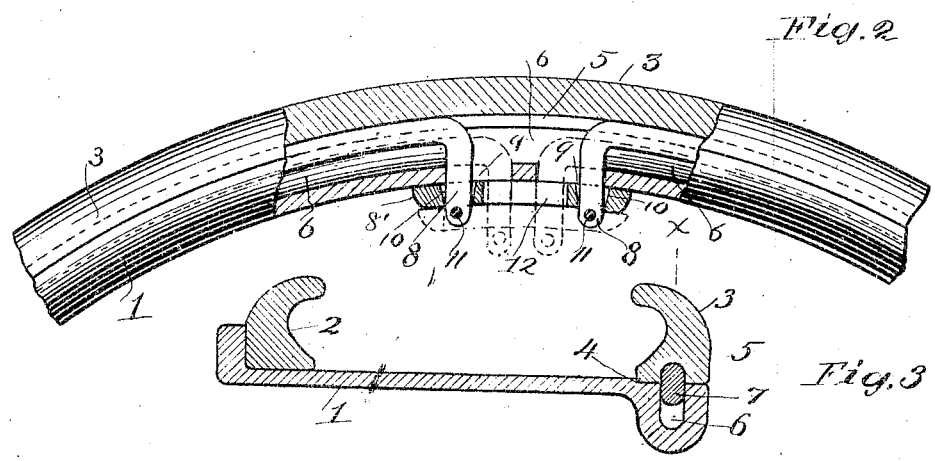
Witnesses
Inventor
William N. Booth
Attorney

UNITED STATES PATENT OFFICE.

WILLIAM N. BOOTH, OF CLEVELAND, OHIO.

QUICKLY-DETACHABLE TIRE-HOLDING RING.

1,049,442.  Specification of Letters Patent.  Patented Jan. 7, 1913.

Application filed December 5, 1910. Serial No. 595,816.

*To all whom it may concern:*

Be it known that I, WILLIAM N. BOOTH, a citizen of the United States, and resident of Cleveland, in the county of Cuyahoga and State of Ohio, have invented certain new and useful Improvements in Quickly-Detachable Tire-Holding Rings, of which I hereby declare the following to be a full, clear, and exact description, such as will enable others skilled in the art to which it appertains to make and use the same.

The objects of this invention are to provide a simple and efficient form of locking ring for a detachable tire retaining ring, which can be used in connection with any convenient form of tire rim and by means of which the following advantages are obtained. The locking device is entirely inclosed within the tire retaining ring and rim and cannot become lost or destroyed. It is so attached that there is no chance of the detachable ring blowing off or of being removed by pressure of any sort so long as the locking device is in its position. It does not interfere however with immediate removal of the tire retaining ring when so desired. It permits of reversing the positions of the tire retaining rings to fit either the straight side or the clencher tire, but it is not intended that the tire retaining rings should be interchangeable since the locking device is applied to only a removable retaining ring.

The invention comprises an annular spring band which enters registering grooves in the outer retaining ring and outer face of the tire rim.

It also includes simple means for contracting the band to the inner portion of the groove in the rim so as to leave the retaining ring perfectly free for removal or replacement as may be desired.

The invention is hereinafter further described and illustrated in detail in the accompanying drawings and is specifically pointed out in the claims.

In the accompanying drawings Figure 1 is a side elevation of a tire rim containing the inclosed contractible locking ring; Fig. 2 is an enlarged longitudinal section of a portion of the rim showing the protruding extremities of the ring and securing means therefor and showing the contractible locking ring in dotted lines in its contracted position; Fig. 3 is an enlarged transverse section of the tire rim showing outer and inner tire retaining rings and the spring locking ring.

In these views 1 represents the tire, 2 the inner tire retaining ring and 3 the outer tire retaining ring.

4 is a shoulder in the tire rim against which the outer retaining ring 3 rests and by means of which the ring is alined to its position whether arranged for the clencher tire or in reverse position arranged to engage the straight side tire.

5 is a groove shown as centrally placed in the inner face of the outer retaining ring 3. Registering with this groove is a deeper groove 6 in the outer face of the tire rim. These grooves are annular and within them is inclosed an annular spring band or locking ring 7, which normally by its spring action will expand and enter the groove in the retaining ring 3, one-half of it remaining within the groove in the rim and one half within the slot in the ring thus preventing any lateral motion whatever of the retaining ring 3. The extremities 8 of this locking ring are spaced apart and protrude radially through openings 9, 9, in the rim 1, so that they can be grasped and forced together to contract the locking ring to the position shown in dotted lines in Fig. 2 below the line of separation of the ring 3 and rim 1 and thus release the ring 3.

Any convenient means for securing the projecting extremities 8 may be employed. As shown in Fig. 2 a simple link 8′ provided with outer openings 10, 10 is employed through which the extremities 8 project and split pins 11, 11 passing through the extremities 8 secure them in position. When brought together both the extremities 8 can be inserted through a central opening 12 in the link and thus held in the contracted position as long as may be desired.

Having described the invention what I claim as new and desire to secure by Letters Patent is:

1. In a locking device for a tire retaining ring, the combination with a tire rim having an annular groove in its outer face and a removable retaining ring provided with a registering annular groove and an annular spring band inclosed in said groove between said rim and retaining ring, the extremities of said annular spring band spaced apart, said rim provided with an opening through which said extremities project, of a locking means therefor, comprising a link provided with central and end openings through which the extremities are alternately inserted.

2. In a locking device for a tire retaining ring, the combination with a tire rim having an annular groove, in its outer face, and a removable retaining ring provided with a registering annular groove, of an annular spring band inclosed in said groove between said rim and retaining ring, the extremities of said annular spring band spaced apart, said rim provided with openings spaced apart through which said extremities project, and an intermediate solid portion, and a member for locking the extremities together, said member provided with a central opening through which said extremities are inserted, when the split ring is collapsed, and with outer openings through which the said extremities are inserted when the split ring is expanded.

In testimony whereof, I hereunto set my hand this 22" day of November 1910.

WILLIAM N. BOOTH.

In presence of—
  Wm. M. Munroe,
  P. Bredel.